United States Patent [19]

Jennings et al.

[11] 4,137,984
[45] Feb. 6, 1979

[54] SELF-GUIDED AUTOMATIC LOAD TRANSPORTER

[76] Inventors: Frederick R. Jennings, 7740 Obsidian Court, Cupertino, Calif. 95014; James O. Moritz, 15830 Rica Vista, San Jose, Calif. 95127

[21] Appl. No.: 848,245

[22] Filed: Nov. 3, 1977

[51] Int. Cl.² ........................................... B62D 1/24
[52] U.S. Cl. ..................................... 180/98; 214/260
[58] Field of Search ...................... 280/112; 243/4, 72; 180/11, 14, 19 R, 19 H, 96, 98, 65 R; 214/302, 620

[56] References Cited

U.S. PATENT DOCUMENTS

| | | | |
|---|---|---|---|
| 3,416,625 | 12/1968 | Naritani | 180/96 |
| 3,514,001 | 5/1970 | DeMerritt | 214/620 |
| 3,560,922 | 2/1971 | Wilson | 180/96 X |
| 3,628,624 | 12/1971 | Wesener | 180/98 |
| 3,664,701 | 5/1972 | Kondur | 180/98 X |
| 3,669,206 | 6/1972 | Tax | 180/98 |
| 3,823,673 | 7/1974 | Wesener | 180/96 X |
| 4,042,058 | 8/1977 | Cooper | 180/98 |
| 4,077,535 | 3/1978 | Oriol | 180/98 X |

Primary Examiner—Joseph F. Peters, Jr.
Assistant Examiner—Terrance L. Siemens
Attorney, Agent, or Firm—Schatzel & Hamrick

[57] ABSTRACT

A self-guided automatic load transporter for moving cargo between two or more locations by following a buried energized conductor and including a body which occupies a volume of space substantially surrounded on four sides by an exterior wall and having its interior divided by a plurality of transverse and longitudinal internal walls of approximately the same height as the external wall, a pair of parallel fork pockets extending between two parallel sides of the exterior wall, three base plates welded to the bottom of a number of the internal walls forming several box-like enclosures accessible only from the top, the plates not entirely covering the bottom and leaving open a number of wells, a cargo plate or bed disposed on top of and covering the body, a lightweight safety bumper extending forwardly and sidewardly from a front end of the transporter which senses obstructions and causes the transporter to stop, independent, motor driven wheels mounted on a common beam axletree which is disposed in a rearward well of the body and which is pivotally attached to the body to support the rearmost portion of the transporter, and two castor wheels, one each located in a front corner well and supporting the front end of the transporter.

14 Claims, 9 Drawing Figures

Fig_1

Fig_2

Fig_3

Fig_5

Fig_6

Fig_7

Fig_8

Fig_9

SELF-GUIDED AUTOMATIC LOAD TRANSPORTER

BACKGROUND OF THE INVENTION

1. Field of the Invention

This invention relates generally to cargo transporters and more specifically to automatic, self-guiding transporters having electrically driven wheels actuated by a control mechanism which senses the magnetic field around a buried guide wire.

2. Description of the Prior Art

A great variety of types of systems and devices are used to solve the problem of transporting merchandise or other cargo from one location to another. Common examples of such systems include heavy-duty conveyor belts, fork lifts, pallet jacks, tuggers, tractors and tow line systems.

A few of the disadvantages with cargo transport systems in use today include that they are very expensive, are usually not very flexible and often require an operator in attendance. In recent years, the self-guided, automatic transporter has revolutionized to cargo transport field by providing a low cost, highly flexible and operatorless method of transporting cargo between two or more locations.

An example of a self-guided load transporter is found in U.S. Pat. No. 3,563,327 which discloses the invention of D. Mier. Mier's patent teaches an electrically motorized vehicle driven by a pair of wheels, one each located on opposite rear corners of the vehicle, each motor being controlled independently to track a buried, energized wire.

U.S. Pat. No. 3,628,624 discloses the invention of E. Wesener which, briefly, is a trackless carriage with two individually driven lateral traction wheels, the carriage having four sensors disposed in a diamond-shaped array which coact capacitively or inductively with a continuous guide strip on the floor to steer the vehicle along a predetermined path by controlling the transmission of driving torque to the wheels.

A primary consideration, obviously, with self-propelled vehicles is to make them safe. For this purpose, a great many safety bumpers, sensitive to contact with an obstruction, have been provided. Safety bumpers found in the prior art are typically made of flexible metal, usually stainless steel, bands which detect contact with an obstruction by closing an electrical contact when deformed. Impact detecting safety bumpers found in the prior art universally suffer two disadvantages, the first being that they are expensive and complicated to produce, repair and replace and the second being that they in themselves may present a safety hazard by presenting hard or cutting edges to the operator.

Self-guided automatic load transporters found in the prior art further have the disadvantage that they are difficult to load. Typically, the transporters cannot be loaded by standard pallet jacks or forklifts because they do not have sufficient undercarriage clearance to allow for the stabilizing feet of the lift to slide underneath. Therefore, the transporters necessarily must be loaded by hand or by trucks equipped with extendable forks, i.e., reach trucks.

Another difficulty with automatic transporters of the prior art is their inability to climb over low obstructions that may be along their guide path while still maintaining drive wheel traction.

SUMMARY OF THE INVENTION

It is an object of this invention to provide a self-guided automatic load transporter which is inexpensive to manufacture and maintain, is flexible in use and which normally requires no operator in attendance.

It is another object of this invention to provide a self-guided automatic load transporter having a lightweight, safe, inexpensive and effective obstruction sensing safety bumper.

It is a further object of this invention to provide a self-guiding automatic load transporter which is quick and easy to load using standard pallet jacks or straddle trucks.

It is yet another object of this invention to provide a self-guided automatic load transporter that can easily climb over low lying obstructions while maintaining wheel traction to accurately guide the transporter along its path.

Yet another object of this invention is to provide a self-guided automatic load transporter which may be lifted by a forklift or pallet jack so that it may be used as a pallet.

Briefly, the preferred embodiment includes a body which occupies a volume of space substantially surrounded on four sides by an exterior wall and having its interior divided by a plurality of transverse and longitudinal internal walls of approximately the same height as the external wall, a pair of parallel fork pockets extending between two parallel sides of the exterior wall, three base plates welded to the bottom of a number of the internal walls forming several box-like enclosures accessible only from the top, the plates not entirely covering the bottom and leaving open a number of wells, a cargo plate or bed disposed on top of and covering the body, a light weight safety bumper extending forwardly and sidewardly from a front end of the transporter which senses obstructions causing the transporter to stop, independent, motor driven wheels mounted on a common beam axletree which is disposed in a rearward well of the body and which is pivotally attached to the body to support the rearmost portion of the transporter, and two castor wheels, one each located in a front corner well and supporting the front end of the transporter.

An advantage to the present invention is that the lightweight, obstruction sensing safety bumper is simple and inexpensive to manufacture and furthermore is extremely safe in that it has no sharp, impaling corners or edges.

Another advantage of the present invention is that its high undercarriage allows the transporter to be easily loaded using standard pallet jacks or straddle wheel forklifts.

A further advantage of the present invention is that its pivotal beam axle construction allows the transporter to climb over obstructions while maintaining equal pressure on both rear drive wheels, insuring accurate tracking of the vehicle along the guide wire.

Another advantage of the present invention is that its fork pockets allow it to be lifted and loaded like a pallet.

These and other objects and advantages of the present invention will no doubt become apparent to those skilled in the art after a reading of the following detailed description of a preferred embodiment which is illustrated in the several figures of drawings.

DETAILED DESCRIPTION OF THE PREFERRED EMBODIMENT

Figure 1:
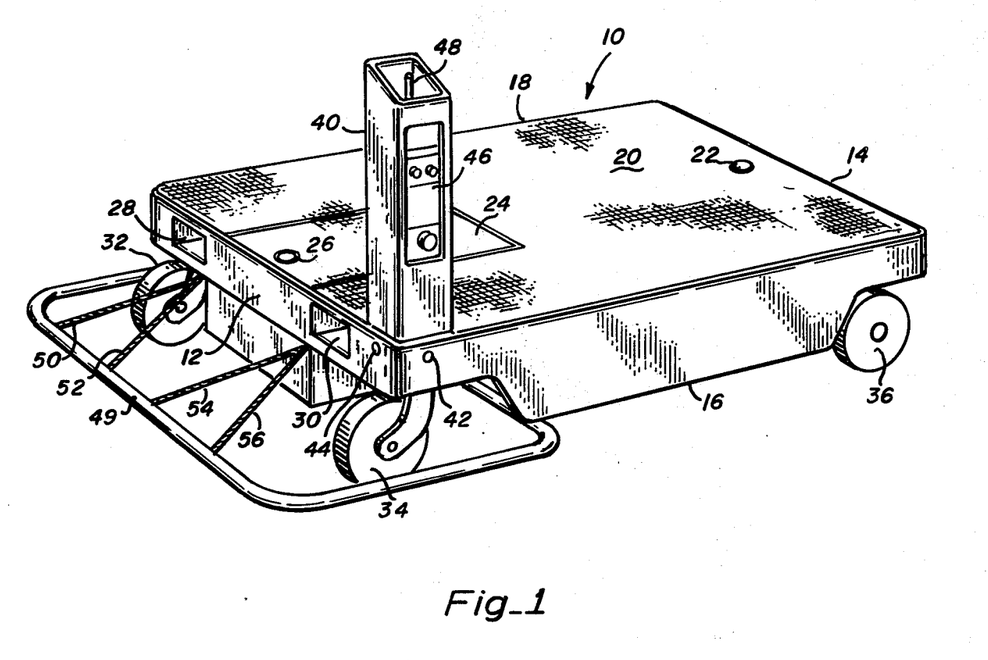
FIG. 1 is a perspective view showing a self-guided automatic load transporter of the present invention.

In FIG. 1, a self-guided automatic load transporter, referred to generally by reference number 10, has a body including an exterior wall having a front wall portion 12, a rear wall portion 14, a left side wall portion 16 and a right side wall portion 18. The body is covered with a cargo plate or bed 20 which has a handle 22 to facilitate in its removal. The cargo plate further has a battery access cover 24 with a handle 26 to aid in its removal. A pair of fork tubes 28 and 30 extend completely through the body between front wall portion 12 and rear wall portion 14.

The body is supported by four wheels including castor wheels 32 and 34, and fixed rotation wheels 36, and, not yet shown, 38. Wheel 32 supports the right front corner of the body, and wheel 34 supports the left front corner of the body. Wheels 36 and 38 are attached to a beam axletree, not yet shown, which in turn is pivotally connected to the body by a pivot and busing arrangement. Each of the rear wheels are driven by an electric motor. Both rear wheels are always in firm contact with the ground due to the pivotal beam axletree arrangement, insuring constant traction of both rear wheels and evenly dividing the load weight between wheels.

The underbody clearance of the transporter is approximately 5", which is generally sufficient to allow a pallet jack or stradle forklift to load from either side 16 or 18 by rolling their stabilizing runners under the body.

A control column 40 rises from the front left-hand corner of the wagon and is held in place by shear bolts 42 and 44. If control column 40 is accidentally struck with great force, for instance by a fork of a forklift, shear bolts 42 and 44 will fracture, allowing the column to topple without extensive damage to the transporter. Situated on the column is a control panel 46 which has switches and dials for controlling the electronic logic circuits of the transporter and a joystick 48 which steers the transporter when it is in a manual mode. The location of the control column was carefully planned to maximize the ease of use of the transporter. When in manual mode, an operator normally stands next to control column 40 with his right hand on joystick 48. Then, by walking in the direction he wishes the transporter to move in, the transporter follows, because the joystick is, without conscious effort, automatically moved in the same direction. Therefore, the control column is normally tall enough so that an operator can lightly rest his hand on the joystick without stooping, bending or reaching.

A bumper 49 extends forwardly of the front end and slightly to either side of sidewall portion 16 and 18. The bumper, in this preferred embodiment, is formed from rigid, lightweight plastic tubing such as of the common PVC variety. Seen as a whole from the top, the bumper would appear generally rectangular with rounded corners. The frontmost portion of the bumper portects against head-on collisions by the transporter and the sideward portions protect the castor wheels and the control column. The bumper is held in position at its frontmost portion by chains or cables 50, 52, 54, and 56. Chains 50 and 52 are attached to front wall portion 12 proximate its right side at a first end and diverge to connect with the front portion of the bumper along its right half. Similarly, chains 54 and 56 are connected at a first end to the front wall portion of the transporter at a point proximate to its left side and diverge to attach to the front portion of the bumper along its left front half. The bumper is supported on its rearward portion by a cable, pulley and spring combination which will be discussed in greater detail in the following figures.

Figure 2:
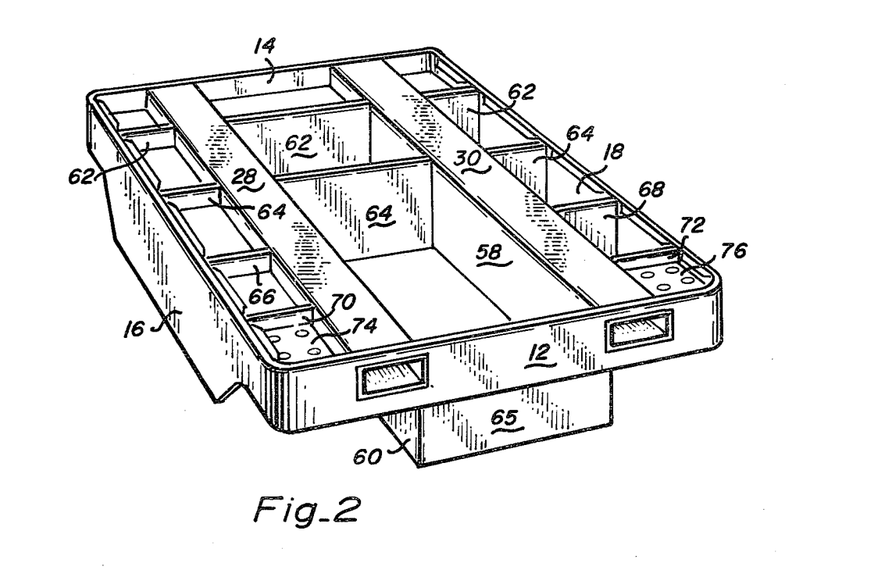
FIG. 2 is a perspective view illustrating the internal body construction of the transporter shown in FIG. 1.

FIG. 2 is a perspective view of the body of the transporter as seen from the top. As is seen in this figure, the internal volume defined by the external wall portions 12-18 is divided into a number of compartments. Dividing the internal volume longitudinally are fork tubes 28 and 30, and partition walls 58 and 60, and dividing the volume transversely are bulkheads 62 and 64. Two more partitions 66 and 68 further divide the internal volume, and webs 70 and 72 are provided to add structural support for castor wheel plates 74 and 76. Each of the castor wheel plates has four holes drilled in them for the studs from a castor wheel mounting assembly.

Figure 3:
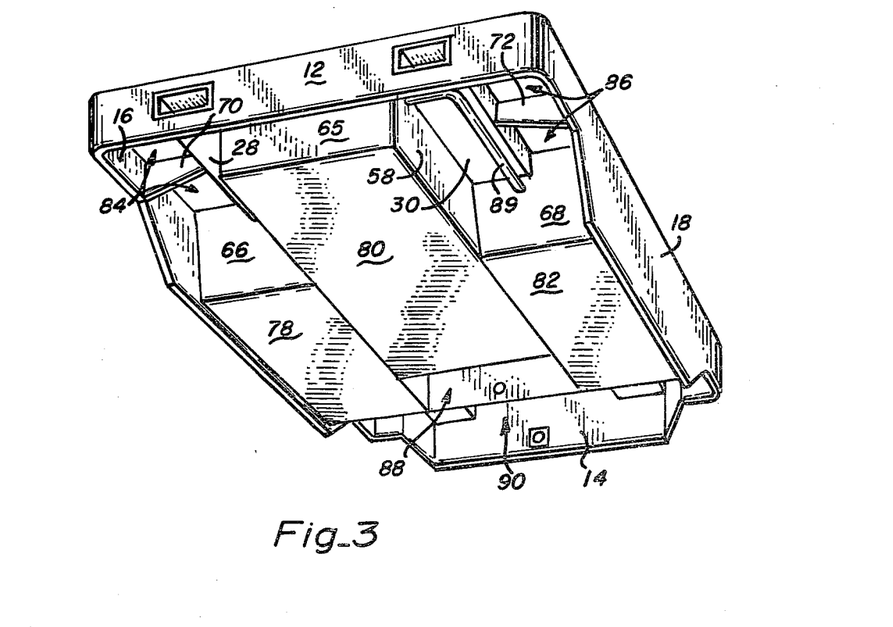
FIG. 3 is a perspective view illustrating the underbody construction of the transporter shown in FIG. 1.

Referring now to FIG. 3, which shows a perspective view of the underbody of the transporter, we see that attached to the bottom of the internal walls are three bottom plates 78, 80 and 82. Combined with the internal partitions and bulkheads, these plates create box-like compartments in which batteries, electronic gear, etc., may be stored. Those areas of the body not covered by a bottom plate form wells 84, 86, 88 and 90. Wells 84 and 86 are subdivided by webs 70 and 72, respectively, and house castor wheels 32 and 34. Well 88 leaves space for guide wire sensing coils, and well 90 is provided for the pivotal beam axletree which will be discussed in greater detail in the following figure.

A pipe 89, usually PVC tubing, is provided to house and protect high current electrical wiring from the battery pack.

Figure 4:
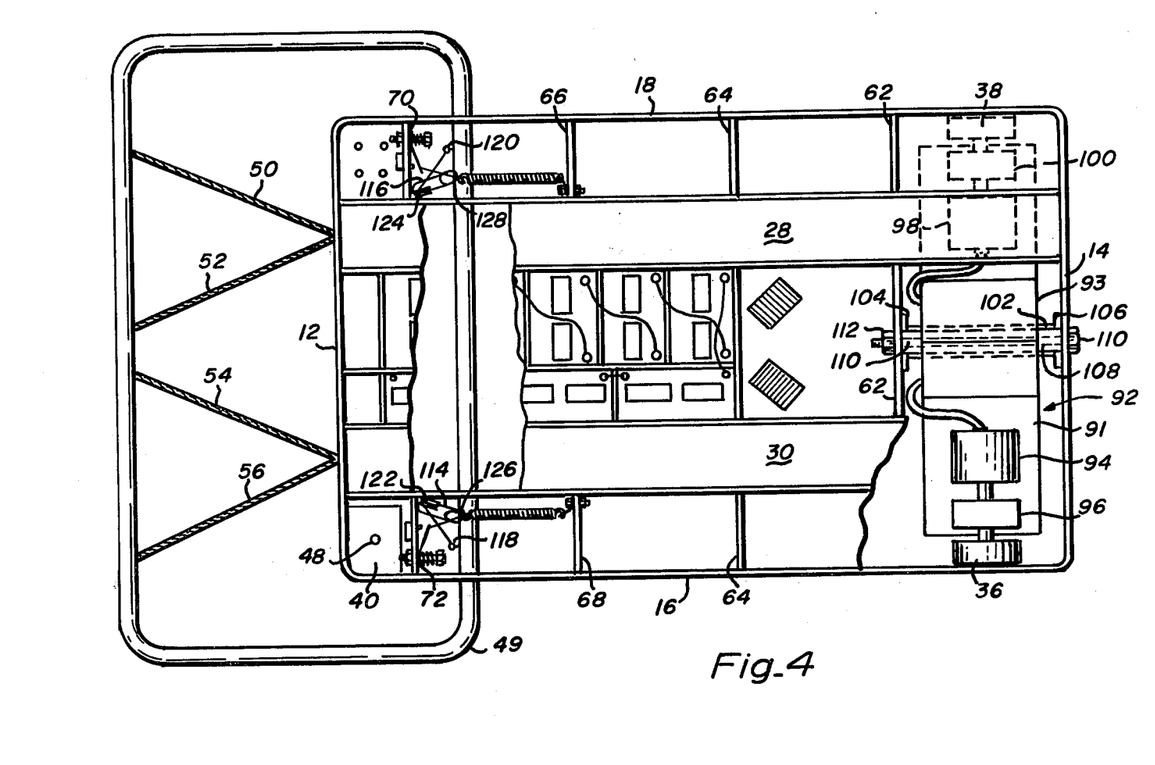
FIG. 4 is a partially broken-away top plan view of the transporter shown in FIG. 1 with the cargo plate removed.

In FIG. 4, we see a partially broken away top plan view of the transporter showing in particular detail the pivoting beam axletree and the bumper mechanism. The top surface of axle 92 is mounting plate 91 and is seen to be generally rectangular. Situated in the center of this rectangular surface is an electronic motor control apparatus 93 which is logically divided, electronically, into left and right wheel motor controls. In response to a signal from the control circuits, the motor control will appropriately power left rear wheel 36 by means of a permanent magnet motor 94 and a spur gear 96 and/or right rear wheel 38 by means of a permanent magnet motor 98 and a spur gear box 100. The pivotal beam axletree has a bushing 102 extending through it along a central axis and rigidly attached to the axletree. The end of bushing 102 falls just short of contacting end plates 104 and 106. Extending through the bushing is a pre-bored, or hollow, pivotal pin 108 which contacts bulkhead 62 at a forward end and rearwall portion 14 at a rearward end. Extending through the hollow pivotal pin is compression bolt 110 which is retained in place by nut 112. When the nut is tightened on bolt 110, bulkhead 62 and wall 14 deflect slightly to strongly grip pin 108. The axletree, therefore, bears on the surface between pivotal pin 107 and bushing 102, and may freely pivot in a transverse direction.

Still referring to FIG. 4, bumper 49 may be more clearly seen in its rounded corner rectangular form. The bumper is supported along its rearmost portion by cables 114 and 116 which are attached to the bumper by eyebolts 118 and 120, respectively, and which round fixed pulleys 122 and 124, respectively, and spring-supported pulleys 126 and 128, respectively, to be solidly attached to webs 72 and 70, respectively.

Figure 5:
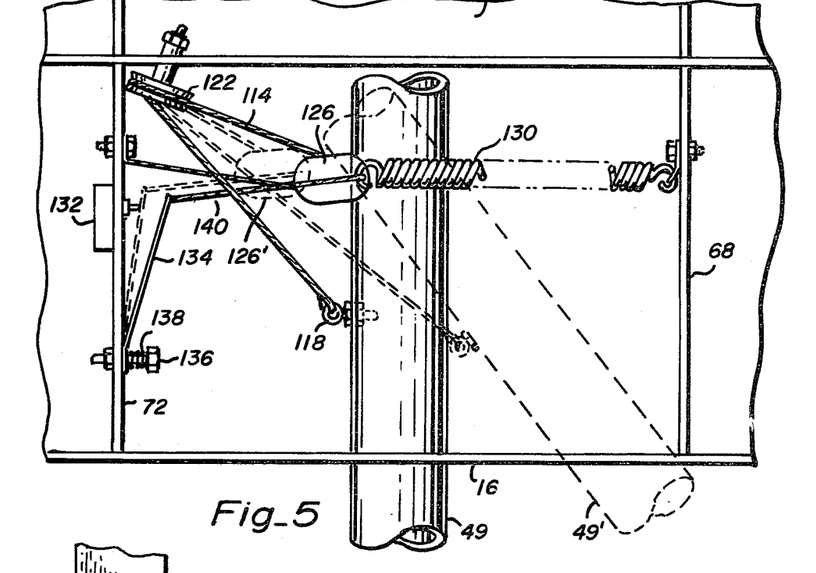
FIG. 5 is an enlarged view further illustrating the safety bumper stop mechanism as shown in FIG. 4.

Referring now to FIG. 5, an enlarged fragmentary view of the safety cut-off bumper system is shown. Eyebolt 118 can be seen to be attached to bumper 49 with a pair of nuts. Fixed pulley 122 is attached to a wall of fork tube 30, being disposed a slight angle relative to the fork tube wall.

Pulley 126 is supported by spring 130 which is connected at a first end to partition 68 by a nut, bolt, and eyelet arrangement and is attached to the second end to an eyelet on the pulley casing of pulley 112. Cable 114 is attached at a first end to eyebolt 118, goes around fixed pulley 122 and spring-loaded pulley 126 and then is attached to web 72 by a nut, bolt, and eyelet arrangement.

A motor deactivating microswitch 132 is mounted on web 72 so that the contact button extends through a hole in the sidewall. When the contact button is depressed, the control electronics of the transporter signal the motor to make a gradual stop, halting the vehicle. Proximate to, and in alignment with, microswitch 120 is switch closure arm 134. Arm 134 is attached to web 72 in a cantilever fashion by nut and bolt 136 and extension spring 138. Because of the pressure exerted by extension spring 138, the normal or rest state for switch closure arm 134 is firmly against the contact button of the microswitch. The end of arm 134 proximate the contact button of the microswitch is connected to the casing of pulley 126 by a second cable 140.

In operation, the safety bumper operates as follows. Under normal conditions, i.e., when no obstacle is encountered by the bumper, bumper 49 is disposed as shown in solid lines in FIG. 5. There is enough slack on cable 114 to allow spring 130 to contract, pulling on cable 140 which, in turn, pulls arm 134, against the spring pressure of spring 138, to the position shown in solid lines. If an obstacle is met, the bumper is moved to a new position, such as shown in dotted lines at 49'. This pulls on cable 114 which, being of fixed length, moves pulley 126 forward to a new position as indicated by dotted lines at 126' against the pressure exerted by spring 130. This creates a slack on cable 140, allowing the expansion of spring 138 to urge arm 134 against the contact button of the microswitch, causing the vehicle to stop. If the obstacle is removed, the bumper will return to its original position, as urged by spring 130, and the transporter's drive motors will again be actuatable.

Figure 6:
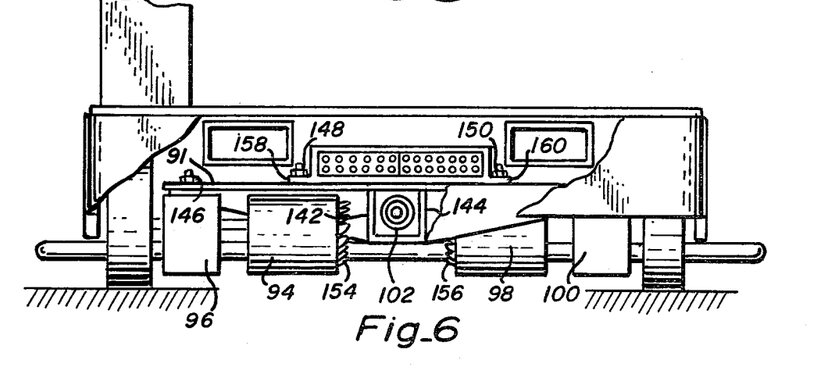
FIG. 6 is a rear elevation of the load transporter shown in FIG. 1 partially broken away to further illustrate the construction of the pivoting beam axletree.

FIG. 6 is a broken away rear elevation view of the transporter and illustrates the pivotal beam axletree and drive mechanism of the present invention. The axle, from this view, has the appearance of an inverted trapezoid. The entire structure, then, of the axletree is a pair of parallel inverted trapezoidal members, each connected along a longer base to a generally rectangular upper mounting plate 91 and braced with a pair of facing webs 142 and 144 which are attached at either end to the trapezoidal sides and along a top surface to the mounting plate. Bushing 102 extends between the two trapezoidal sides and is rigidly attached thereto. Motors and gear boxes 94, 96, 98 and 100 are attached to the bottom side of the axletree by mounting brackets and associated studs and bolts 146, 148, 150 and, not shown, 152, respectively.

To cool the motors and to dissipate the considerable heat at times generated by the associated electronic control circuitry, a pair of fans 154 and 156 are coupled to the end of the motor shafts of motors 94 and 98, respectively, pulling air from underneath the body and from the electronic circuitry through the motor and gear housing and up past the remainder of the axletree assembly. The entire axle assembly is constructed, in this preferred embodiment, from heavy aluminum plate which is designed to double as a large heat sink for the electronic circuitry. The electronic control circuits are further heat sunk and held in position by plates 158 and 160.

Figure 7:
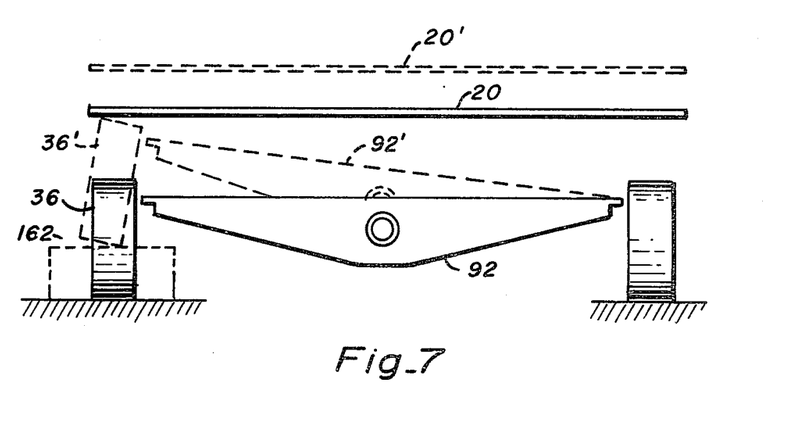
FIG. 7 is a simplified diagrammatic view of the pivoting beam axletree shown in FIG. 6 and illustrating the action of the axle as it rides over a low lying obstruction.

FIG. 7 shows a simplified diagram of the pivotal axle as left wheel 36 climbs over a low lying obstacle 162. Before wheel 36 contacts the obstacle, the axle is in a horizontal position, as is indicated by its solid line representation at 92. As the wheel climbs over obstacle 162 to a new position 30', the axletree pivots to the position shown in 92', which causes cargo bed 20 to shift to a new position, as indicated by 20'. Because the pivoting axletree supports the body essentially as a single wheel, the bed remains level in a transverse direction due to the two transversely leveling pivotal wheels which comprise two-thirds of an essentially three-point contact with the ground. Further, the pivotal beam axle equally divides the load carried by the transporter between the driven wheels, even when climbing over an obstacle, reducing stress and equalizing the load between the wheels.

Figure 8:
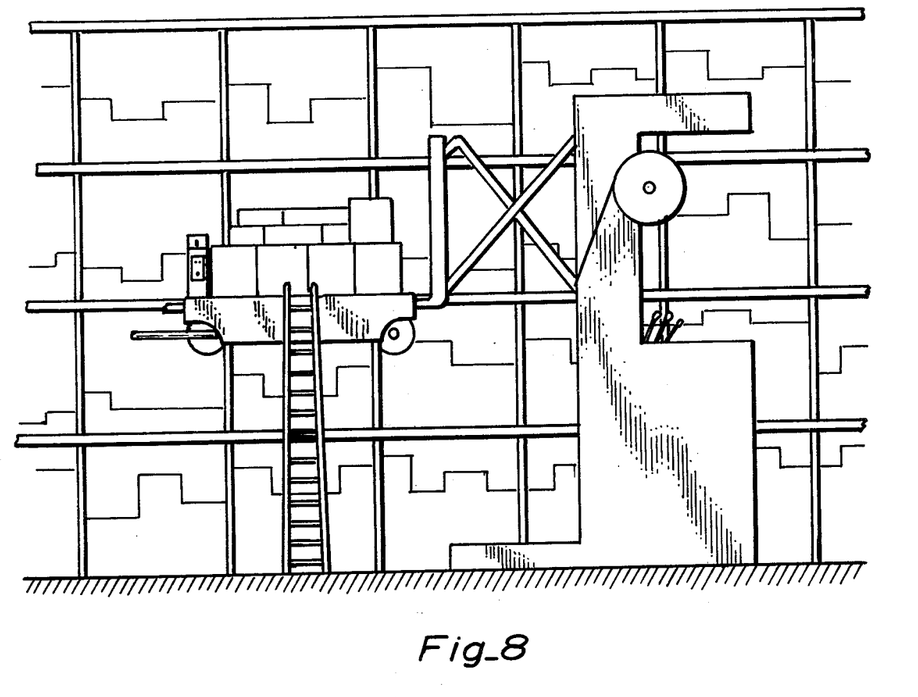
FIG. 8 is a side elevation of the transporter as shown in FIG. 1 being used with a forklift so that cargo may be directly loaded from warehouse shelving.

FIG. 8 is a pictorial side view of the transporter of the present invention being directly loaded with cargo from stock shelves. A power forklift is shown to be engaging the fork pockets of the transporter and lifting it to the correct shelf height for direct loading onto the transporter. The transporter may then be moved to a location near the buried, energized wire track, put down into position and allowed to assume automatic control. This saves in the laborious steps of loading and unloading which often involve loading a cart from a shelf, moving it to the transporter and then unloading it onto the transporter.

The fork pockets are also useful if, for some reason, the transporter should become immobilized due to malfunction or loss of battery power, because it may then easily be lifted and moved to a repair site.

Figure 9:
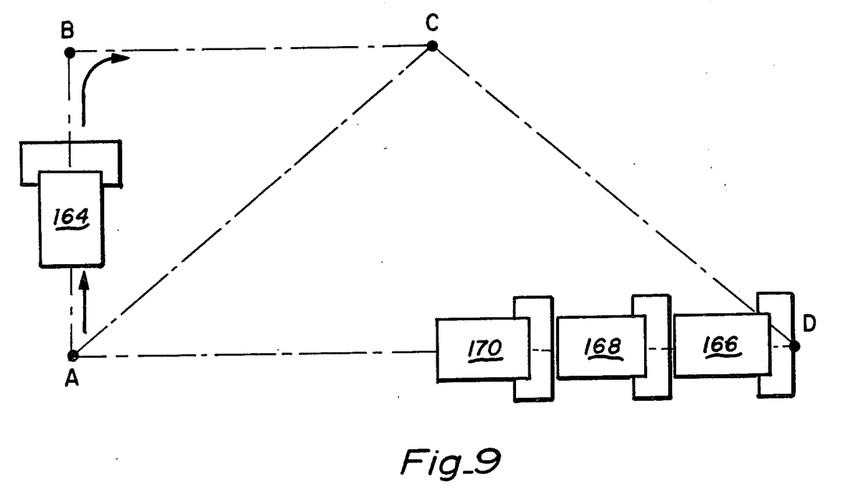
FIG. 9 is a top plan pictorial view showing the deployment of self-guided automatic load transporters along a hypothetical buried, energized wire track.

FIG. 9 shows, by dotted lines, a hypothetical guide wire track for the transporters of the present invention having four-way stations A, B, C and D. A transporter 164 is shown in the automatic mode following the guide wire from station A past station B to station C. When the transporter arrives at station C, control circuitry automatically stops the transporter there until a new transporter signal is received to return it to station A or to continue on to station D.

Transporters 166, 168 and 170 illustrate an automatic indexing capability of the transporter. Transporter 166 was sent to station D from station A and, when it arrived there, automatically stopped. Transporter 168 similarly was sent from station A to D but, before it could reach station D, contacted the rear of transporter 166. This, of course, stopped transporter 168 behind transporter 166. Transporter 170 was sent to station C from station A by way of station D, but, in a similar manner as already discussed, contacted the rear of transporter 168 and stopped. Until transporter 168 is given the electronic command to continue on, transporter 168 and 170 will remain behind it. After transporter 166 is unloaded and sent on its way, transporter 168 will arrive at station D and stop and transporter 170 will come up behind it and also stop as its bumper contacts the rear of transporter 168. After transporter 168 is unloaded and sent on its way transporter 170 will continue along the track to location C.

It is anticipated that those skilled in the art will, upon reading the preceding specification, recognize various modifications and permutations of the described transporter which are within the scope and spirit of the present invention. It is therefore intended that the appended claims delineate the metes and bounds of the present invention so as to include all such modifications and permutations.

What is claimed is:

1. A self-guided automatic load transporter comprising: a generally rectangular vehicle body including
    parallel front end and rear end walls and parallel left side and right side walls,
    a plurality of transverse and longitudinal upright internal walls dividing said body into a plurality of portions,
    base plate means closing the bottom of a number of said portions to form upwardly opening box-like compartments, at least three of the remaining unclosed body portions forming wheel wells,
    a pair of parallel fork tubes extending through the body and open on at least one end to form means for receiving the forks of a forklift, and
    a cargo plate forming the top surface of said body and serving to close the tops of said portions to thereby cover said compartments;
    first and second castor wheels disposed within two of said wells for supporting one end of said body;
    an elongated axletree having a first drive wheel attached to one end thereof and a second drive wheel attached to the other end thereof, said axletree being disposed in said third well and pivotally attached to and supporting the other end of the body;
    first and second drive means carried by said axletree for powering said first and second driven wheels, respectively;
    bumper means formed into a closed loop having a forward portion and a rearward portion, said bumper means being disposed around said castor wheels and beneath said body, with said forward portion partially extending forwardly and sidewardly of said front end wall;
    suspension means for attaching said bumper means to said body; and
    a bumper contact sensing means responsive to bumper displacement and operative to de-energize said drive means, thereby halting motion of the transporter.

2. A self-guided, automatic load transporter as recited in claim 1 further comprising a control column rising perpendicularly through said cargo plate and attached to a sidewall of said body.

3. A self-guided, automatic load transporter as recited in claim 1 wherein said cargo plate includes a battery access cover.

4. A self-guided, automatic load transporter as recited in claim 1 wherein said first and second drive means each comprise an electric motor, and a spur gear drive box coupled to said motor at a first end and coupled to a drive wheel at a second end.

5. A self-guided, automatic load transporter as recited in claim 1 further comprising first and second fan means coupled to said first and second drive means, respectively, whereby said fans provide cooling air for said drive means and for electronic control means associated with said drive means.

6. A self-guided, automatic load transporter as recited in claim 1 wherein said fork tubes extend between said front and rear walls.

7. A self-guided, automatic load transporter as recited in claim 1 wherein said axletree comprises facing, inverted trapezoidally shaped members and a rectangular mounting plate having an upper and lower mounting surface attached to the longer parallel edges of said trapezoidally shaped members, said axletree further comprising a pivot bushing extending between said trapezoidally shaped members.

8. A self-guided, automatic load transporter as recited in claim 7 further comprising strengthening webs extending between and attached to said trapezoidally shaped members.

9. A self-guided, automatic load transporter as recited in claim 1 wherein said closed loop bumper means is substantially rectangular.

10. A self-guided, automatic load transporter as recited in claim 1 wherein said bumper means is made from lightweight plastic tubing.

11. A self-guided, automatic load transporter as recited in claim 1 wherein said suspension means comprises:
    a first flexible line means attached at a first end to said body and attached at a second end to the forward portion of said bumper means;
    a second flexible line means attached at a first end to said body and attached at a second end to the rearward portion of said bumper means.

12. A self-guided, automatic load transporter as recited in claim 11 wherein said first and second flexible line means each comprise a cable.

13. A self-guided, automatic load transporter as recited in claim 11 wherein said suspension means further comprises:
    a fixed pulley attached to said body, said second flexible line means being trained over said fixed pulley at a first midportion thereof;
    a spring loaded pulley attached to said body, said second flexible line means being further trained over said spring loaded pulley at a second midportion thereof.

14. A self-guided, automatic load transporter as recited in claim 13 wherein said sensing means comprises:
a push button switch;
a switch activating, spring loaded cantilever, said cantilever being resiliently attached at a first end to said body and where the second end of said cantilever is urged towards the push button of said switch;
a cable means attached at a first end to the housing of said spring loaded pulley and attached at a second end to the second end of said cantilever, whereby when said bumper is not in contact with an obstacle said cable means pulls, due to pressure exerted by the spring loaded pulley, the second end of said cantilever away from said push button and when said bumper is in contact with an obstacle said cable means is slackened, allowing said spring loaded cantilever to depress said push button, halting transporter motion by de-energizing said drive means.

* * * * *